United States Patent
Tang et al.

(10) Patent No.: US 6,941,192 B2
(45) Date of Patent: Sep. 6, 2005

(54) ROBOT MACHINING TOOL POSITION AND ORIENTATION CALIBRATION

(75) Inventors: Qing Tang, Granby, CT (US); Hakan Brantmark, Vasteros (SE); Zhongxue Gan, Windsor, CT (US); Torgny Brogardh, Vasteras (SE)

(73) Assignee: ABB Research Ltd., Zurich (CH)

(*) Notice: Subject to any disclaimer, the term of this patent is extended or adjusted under 35 U.S.C. 154(b) by 180 days.

(21) Appl. No.: 10/355,764

(22) Filed: Jan. 31, 2003

(65) Prior Publication Data

US 2003/0167103 A1 Sep. 4, 2003

Related U.S. Application Data

(60) Provisional application No. 60/353,671, filed on Jan. 31, 2002.

(30) Foreign Application Priority Data

Jan. 31, 2003 (WO) .............................. PCT/US03/03052

(51) Int. Cl.[7] .......................... G05B 19/04; G05B 19/18
(52) U.S. Cl. ...................... 700/254; 700/245; 700/248; 700/249; 700/250; 700/258; 700/259; 700/260; 700/261; 700/262; 700/263; 700/264; 318/568.1; 318/568.16; 702/91; 702/94; 702/105; 702/113; 701/23; 901/30; 901/39
(58) Field of Search ................................. 700/245, 192, 700/248–250, 258–264; 702/91, 94, 105, 113; 318/568.16, 568.11, 568.14; 701/23; 901/30, 39

(56) References Cited

U.S. PATENT DOCUMENTS

| | | | | |
|---|---|---|---|---|
| 4,477,754 A | * | 10/1984 | Roch et al. .............. | 318/568.1 |
| 4,561,050 A | | 12/1985 | Iguchi et al. | |
| 5,392,384 A | * | 2/1995 | Tounai et al. ............... | 700/254 |
| 5,457,367 A | * | 10/1995 | Thorne ................... | 318/568.11 |
| 5,483,138 A | * | 1/1996 | Shmookler et al. .... | 318/568.16 |
| 5,829,928 A | * | 11/1998 | Harmand et al. .......... | 408/83.5 |
| 5,910,719 A | | 6/1999 | Thorne ....................... | 318/560 |
| 5,929,584 A | | 7/1999 | Gunnarsson et al. | |
| 6,044,308 A | * | 3/2000 | Huissoon .................... | 700/166 |
| 6,044,310 A | * | 3/2000 | Douglass .................... | 700/192 |
| 6,071,176 A | * | 6/2000 | Kruis ............................ | 451/5 |
| 6,321,137 B1 | * | 11/2001 | De Smet .................... | 700/245 |
| 6,327,517 B1 | * | 12/2001 | Sundar ....................... | 700/245 |
| 6,356,807 B1 | * | 3/2002 | McGee et al. .............. | 700/253 |
| 6,430,472 B1 | * | 8/2002 | Boillot et al. .............. | 700/245 |
| 6,463,782 B1 | * | 10/2002 | Shen et al. .................. | 73/1.79 |
| 6,502,054 B1 | * | 12/2002 | Mooring et al. ........... | 702/150 |
| 6,516,248 B2 | * | 2/2003 | McGee et al. ............. | 700/254 |
| 6,587,802 B1 | * | 7/2003 | Schroder et al. ............. | 702/91 |
| 6,678,581 B2 | * | 1/2004 | Hung et al. ................. | 700/245 |

FOREIGN PATENT DOCUMENTS

EP 1 139 189 A2 4/2001

OTHER PUBLICATIONS

Dai et al., PIN–a PC–based robot simulation and offline programming system using macro programming techniques, 1999, IEEE, vol.: 1 , Page(s): 442–446 vol. 1.*

* cited by examiner

*Primary Examiner*—Thomas G. Black
*Assistant Examiner*—McDieunel Marc
(74) *Attorney, Agent, or Firm*—Cantor Colburn LLP

(57) ABSTRACT

A robot having a spindle is calibrated by disposing a calibration tool in the robot spindle. The position of the calibration tool is measured. An axis of the spindle is determined based on the measured position. A calibration tool center point is determined based on the measured position. A robot tool rotation axis is determined based on the determined spindle axis, robot tool center point, the determined calibration tool center point, and difference in length between the calibration tool and a robot tool.

22 Claims, 5 Drawing Sheets

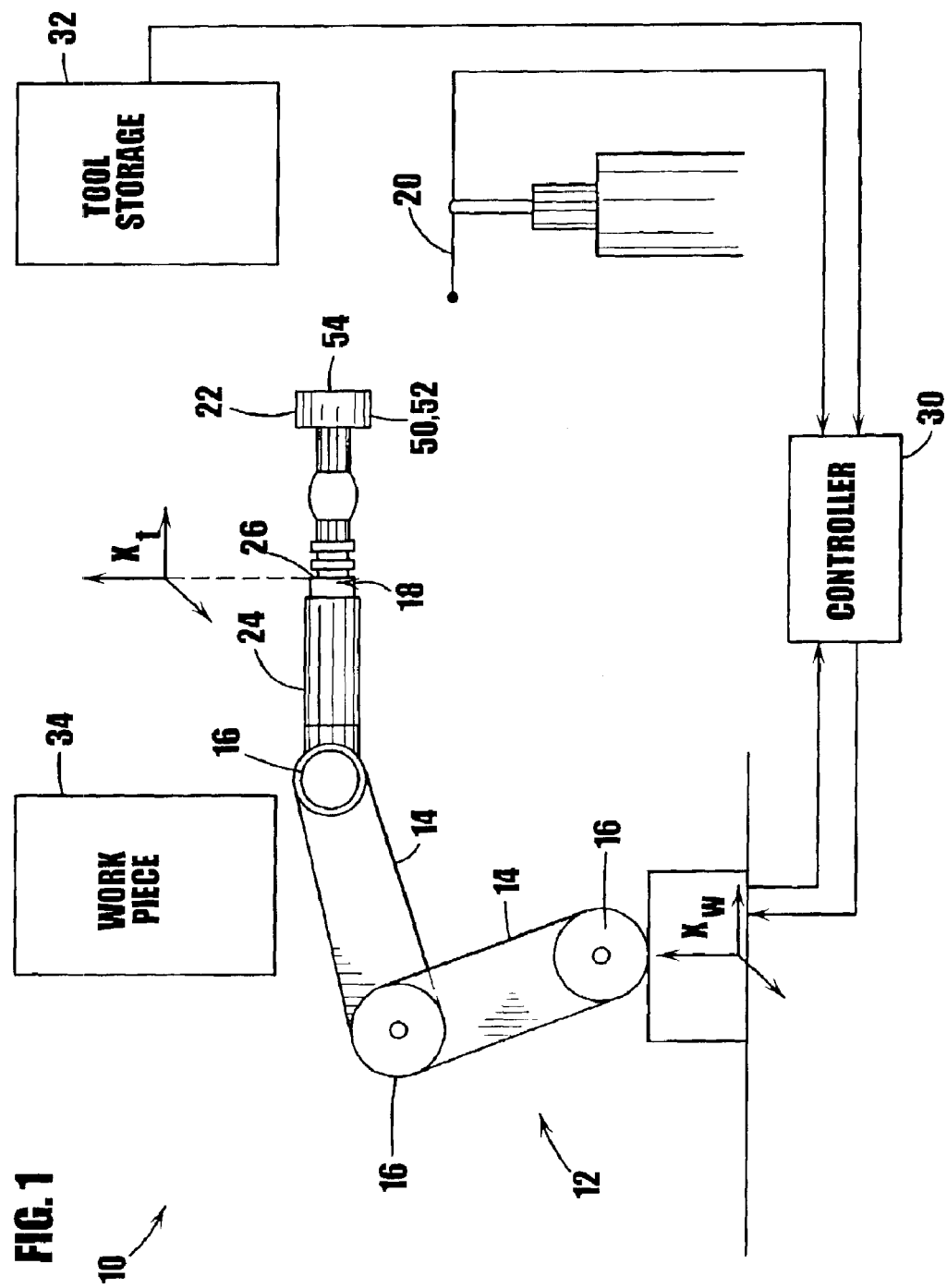

ROBOT MACHINING TOOL POSITION AND ORIENTATION CALIBRATION

CROSS REFERENCE TO RELATED APPLICATIONS

This application claims the benefit of PCT/US03/03052 filed Jan. 31, 2003 which claims the priority of U.S. provisional application No. 60/353,671 filed Jan. 31, 2002 the contents of which are incorporated by reference herein in their entirety.

BACKGROUND

The invention relates to robots and more particularly, to robot tool position and orientation calibration.

High level computer programming languages and Computer Aided Drafting/Computer Aided Machining (CAD/CAM) has made off-line robotic programming more feasible for more complex tasks. For example, a robot may be programmed to cut a workpiece with a circular blade tool and then remove material from the workpiece with a drill bit tool. The robot uses various coordinate systems to facilitate calculating the several motions required to cut and remove material from the workpiece. Because one or more of the various coordinate systems may not exactly match actual robot positions (e.g., due to imperfect alignment of the robot, robot parts, tools, and the like), robot calibrations are typically used to compensate for such mismatches.

The use of multiple tools (e.g., a circular blade and a drill bit) further complicates calibration because each tool typically has a different tool center point (TCP), e.g., each tool may have a different length. As such, a robot is normally recalibrated for each such tool. Such calibration requires additional time and expense. Normally, each tool is mounted into the robot spindle and a standard TCP calibration is performed. This determines the TCP of each tool. Further, spindle orientation is determined by the orientation determined from the two TCP positions. There are several deficiencies to this approach. First, this approach assumes that the spindle axis is the same as tool orientation (this is not typically true when mechanical tolerance and mounting error are considered). Second, the TCP of the tool is calibrated using visual inspection that may not be reliable or repeatable. Third, this recalibration for each tool can be time consuming, adding expense, and increases the chance for errors.

Therefore, a need exists for using different robot tools without having to perform a recalibration for each tool.

BRIEF SUMMARY OF AN EXEMPLARY EMBODIMENT

The invention is directed to calibrating the orientation of a robot spindle and applying the calibrated robot spindle orientation to various robot tools.

Disclosed herein in an exemplary embodiment is a method of calibrating a robot having a rotable spindle for holding a tool. The method comprises disposing a calibration tool in said spindle; measuring a plurality of positions associated with the calibration tool; and determining a rotation axis of the spindle based on the plurality of positions. The method also includes: ascertaining a calibration tool center point based on the plurality positions and computing a robot tool rotation axis and tool center point based on the determined rotation axis; the calibration tool center point, and a difference in length between the calibration tool and a robot tool.

Also disclosed herein is a system for calibrating a robot having a rotable spindle for holding a tool, the system comprising: a calibration tool disposed in the spindle of the robot; a measurement probe disposed at a known location within attainable distance of the robot with the calibration tool; and a controller for implementing a method of calibrating comprising: measuring a plurality of positions associated with the calibration tool; and determining a rotation axis of the spindle based on the plurality of positions. The method also includes: ascertaining a calibration tool center point based on the plurality positions and computing a robot tool rotation axis and tool center point based on the determined rotation axis; the calibration tool center point, and a difference in length between the calibration tool and a robot tool.

BRIEF DESCRIPTION OF THE DRAWINGS

The invention is further described in the detailed description that follows, by reference to the noted drawings by way of non-limiting illustrative embodiments of the invention, in which like reference numerals represent similar parts throughout the drawings. As should be understood, however, the invention is not limited to the precise arrangements and instrumentalities shown. In the drawings:

FIG. 1 is a simplified diagram depicting a robot system with calibration

DETAILED DESCRIPTION OF ILLUSTRATIVE EMBODIMENTS

Figure 2A:
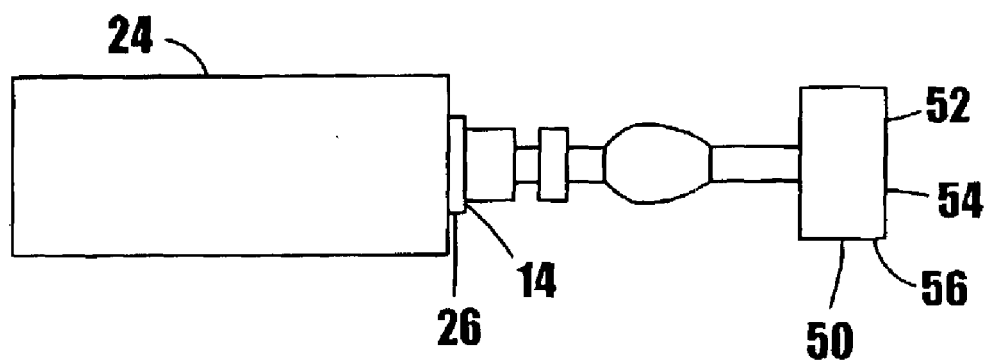
FIG. 2A is a diagram of an illustrative robot tool, in accordance with an exemplary embodiment.

This invention is directed to calibrating the orientation of a robot spindle and applying the calibrated robot spindle orientation to various robot tools. Referring to FIG. 1, a simplified block diagram of a robot system 10 is depicted. The robot system 10 includes, but is not limited to a robotic manipulator 12 comprising various arms or linkages 14 linked by rotable, variable joints 16 with a rotable spindle 18 disposed on one such arm 14. The robot system also includes a measurement probe 20 within an attainable distance in the work area of the robotic manipulator 12 such that a tool 22 disposed in the spindle 18 may be moved in a manner to contact the probe 20. The tool 22 may also be disposed at a fixed location or position in the robot work area or fixed in the robot work cell to facilitate direct measurement employing a similar approach.

The measurement probe 20 conveys information to a controller 30 indicating when the tool 22 is in contact with the probe 20. This information could be as simple as a Boolean e.g., contact, no contact, or the probe could include absolute or relative position measurement information. The measurement probe 20 may include, but not be limited to a 1, 2, and 3 dimensional coordinate measurement machine (CMM) probes, touch probes, position sensors such as potentiometers, LVDTs (Linear Variable Displacement Transformers), and the like, gauging sensors, non-contacting sensors such as magnetic, laser, ultrasonic, and infrared sensors, and the like, as well as combinations including at least one of the foregoing. Similarly, it will be appreciated that employing a measurement probe 20 that includes a displacement sensor may facilitate computations for the calibration. For example, employing a displacement sensor instead of a touch probe would facilitate a direct measurement of actual position and computation of differences for each measurement and there by simplify computing the tool center point and axis of rotation.

The work area may also include a workpiece 34, upon which robot based operations are to be performed. The robot system may also include appropriate tool storage 32 to facilitate selecting a particular tool 22 in accordance with specified instructions. Appropriate interlocks may optionally be employed to ensure that a proper tool has been selected and engaged by the robot 12 from the tool storage 32 to perform the desired function.

Figure 2B:
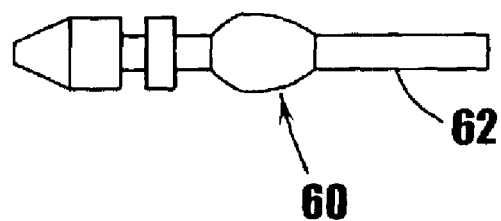
FIG. 2B is a diagram of another illustrative robot tool, in accordance with an exemplary embodiment.

Referring to FIG. 2A, a first robot tool, hereinafter referred to as a calibration tool 50, in this case, but not limited thereto, a cylinder denoted 52, may be used to calibrate the orientation of a robot spindle 18 on a robot 12, as described in more detail below. The spindle 18 may generally be mounted to a spindle motor 24 for driving the selected robot tool. FIG. 2B depicts a second robot tool 60, in this case a drill bit, denoted 62 as may be used in the robot without performing a manual recalibration to determine the tool center point (TCP) of the drill bit 62. Rather, the measured lengths of the calibration tool 50 and second robot tool 60, from the spindle face 26, are used calibrate the robot 12 for the second robot tool 60, as described in more detail below. FIGS. 2A and 2B depict and denote the measured length of the calibration tool 50 as Cylinder Length and the measured length of the second robot tool 60 as Tool Length. It will be appreciated that if the measured lengths for the calibration tool 50 and subsequent robot tools e.g., second robot tool 60, are known, upon calibration, the robot can properly place a selected robot tool e.g., the drill bit 62 to correctly perform a corresponding operation on the workpiece 32.

In an exemplary embodiment, the calibration tool 50, a cylindrically shaped tool is used as a calibration target. An exemplary tool of known dimension e.g., Cylinder Length, and radius, is shown in FIG. 2A. It will be appreciated that while a cylinder is employed and described for an exemplary embodiment, other configurations of the calibration tool 50 are possible. For example, the calibration tool 50 may readily be cylindrical, hollowed cylinder, a disk (flat cylinder) spherical, cubic, conic, tubular, and the like. A cylinder calibration tool has been selected for simplified measurements and mathematical computations for determination of the TCP. Other configurations of robot tools e.g., 60 may promote selection of a calibration tool 50 of a different configuration. FIGS. 4A–4F depict illustrative calibration tools 50 and measurements for tools of various shapes and configurations.

Returning to FIG. 1, in an exemplary embodiment, a coordinate measuring machine (CMM) probe 20 is located at a fixed, known, position in the robot work area. The position ($x_0$, $y_0$, $z_0$) of the CMM probe 20 is determined, for example, by using a TCP calibration approach with a (sphere) of known dimensions. The cylindrically shaped calibration tool 50 is mounted in a robot spindle 18 and a methodology for calibration is performed.

To simplify calculations, two coordinate systems for the robot are defined. The first is denoted the world coordinate system, Xw and is generally the robot base coordinate frame. The world coordinate system, Xw is fixed relative to the robot and does not change as the robot is manipulated.

The second coordinate system Xt is referenced to the robot mounting flange or face 26 (for mounting the spindle 18). As the robot moves, the second coordinate system Xt moves relative to the world coordinate system Xw. The tool position, as mounted to the spindle 18 is relative to the second coordinate system and therefore, does not change with respect to the that coordinate system.

Turning now to the calibration methodology, the CMM probe 20 is placed in a fixed location with the tip of the probe at $X_0$. When the robot touches the probe, the robot position is recorded as $T_0$ in the robot world coordinate system Xw. The probe position in the mounting flange coordinate system is $X_{0'}$ =inv($T_0$)*$X_0$, where inv($T_0$) is the matrix inverse of the matrix $T_0$. $X_0'$ is in the mounting flange coordinate system ($X_t$) and all touch points in the $X_t$ coordinate system can be used to determine a plane or cylinder model.

Figure 3:
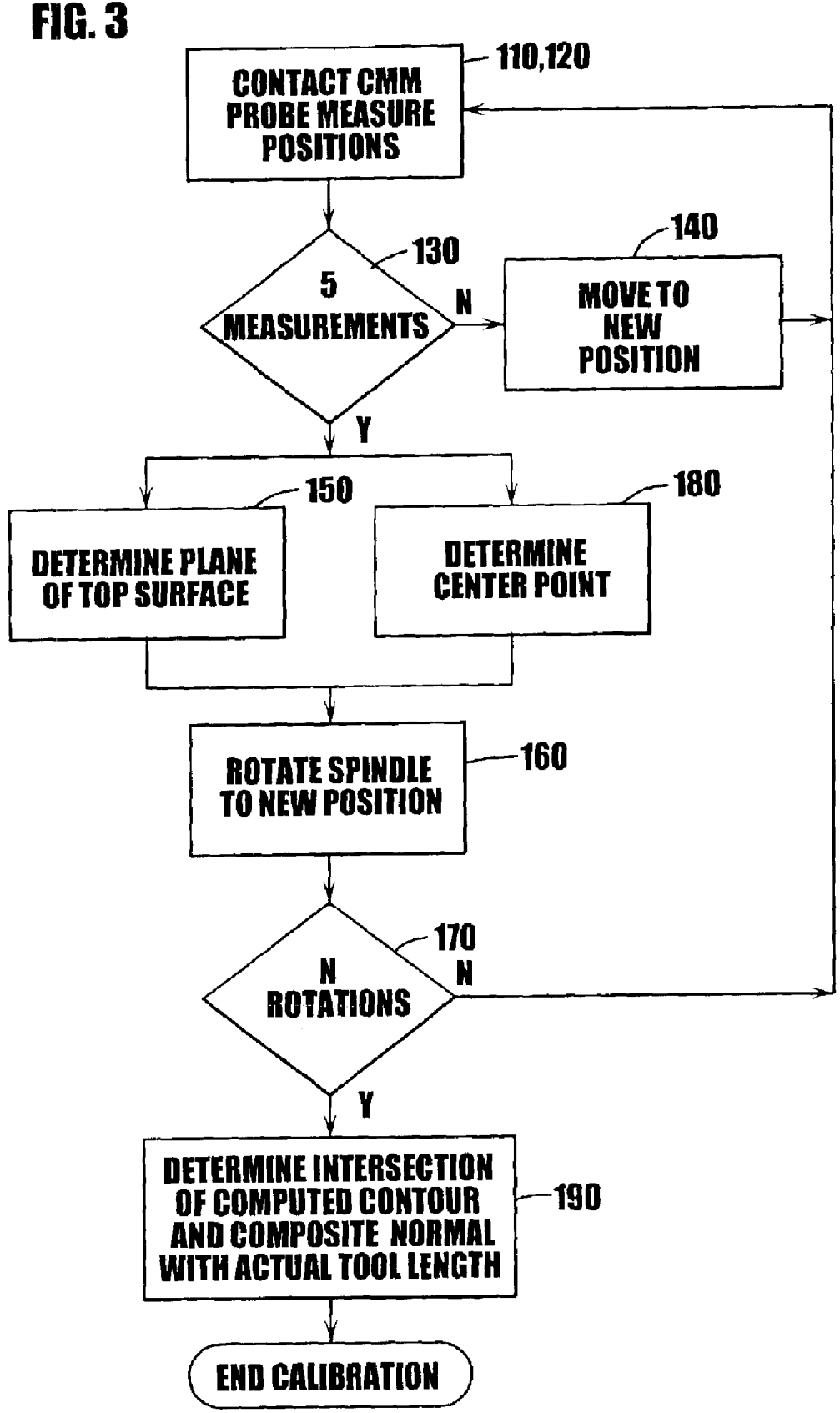
FIG. 3 is a flow chart depicting an illustrative process for calibrating a robot of an exemplary embodiment.

FIG. 3 depicts an exemplary process for performing a robot calibration, 100 employing a TCP measurement procedure. Referring now to the figure, at process block 110 the robot is moved until contacting a CMM probe 20 located in a fixed, known, position in the robot work area with a first surface 54 e.g., top axial surface of the calibration tool 50, e.g., cylinder 52. The robot may be moved manually by jogging or nudging the robot position small increments, or automatically, employing a preprogrammed routine to coordinate the movement. Automatic movement of the robot 12 facilitates an automatic calibration procedure, which may further accelerate the process for robot calibration 100.

At process block 120, at a first angular position of the spindle 18 (e.g., at theta=0 degrees where theta is the angular rotation of the spindle 18 as measured with a spindle angle encoder on the robot), the normal of the top surface 54 (nxl, nyl, nzl) of the cylinder 52 is determined with measurements taken in conjunction with the CMM probe 20. A recursive loop initiated at decision block 130 and block 140 facilitates repeated measurements for five different positions on the top surface 54. A measurement of five points on the top surface 54 can determine the plane position (nxl, nyl, nzl, dl). While five points are utilized in an exemplary embodiment, it will be appreciated that at least three points are necessary to determine the orientation of a plane. Additional measurements are utilized to improve the accuracy and reliability of the determination of the orientation of the plane. Process block 150 depicts the determination of a first plane for the top surface 54 of the calibration tool 50 e.g., cylinder 52. The determined plane orientation for the top surface 54 is relative to the robot spindle face 26 and mounting flange coordinate system denoted $X_t$. The normal to this plane should define the axis of rotation for the spindle 18. However, due to inaccuracies, the normal to the plane determined above may not exactly align with the axis of rotation for the spindle 18. To alleviate this inaccuracy, an additional measurement is taken to improve the accuracy of the calibration process 100.

Continuing with the figure, at block 160, the spindle 18 may now be rotated to a second angular position (e.g., to 2*pi*n/N degree position, where n can be 1, 2, N-1). In an exemplary embodiment, N is selected to be greater than or equal to four depending on accuracy and repeatability requirements. It will be appreciated, once again, that increasing N, generally increases accuracy of the determination. At this rotation, the above mention procedure of process block 110–150 is repeated to determine a second plane defining the top surface 54 of the calibration tool 50. This process may be repeated to obtain i separate cylinder top plane positions ($nx_i$, $ny_i$, $nz_i$, $d_i$) corresponding to each respective spindle angle ($theta_i$). Decision block 170 depicts repeating the process for n rotations.

Each determined cylinder top plane position ($nx_i$, $ny_i$, $nz_i$, $d_i$) is likely to be slightly different due to mounting errors of the cylinder tool to the spindle, machining imperfections of the cylinder tool, and the like. Averaging the measured data to obtain a composite normal vector is determined by synthesizing all normal vectors, according to the following:

$nx = \text{sum}(Nx_i)/N$ $ny = \text{sum}(Ny_i)/N$ $nz = \text{sum}(Nz_i)/N$

The resultant composite normal vector nx, ny, nz represents a composite orientation for the axis of rotation of the spindle 18.

Continuing with FIG. 3, at process block 180 the axis of the calibration tool 50, e.g., cylinder 52 may readily be determined in a manner similar to that described above. It will now be appreciated that the cylinder axis may not necessarily be the same as the normal of the top surface 54 of the cylinder 52 (as determined above) due to imperfections of the cylinder tool 52. Therefore the center of the top surface 54 of calibration tool 50 may readily be determined by measuring a number points on the side surface 56 of the calibration tool 50 e.g., cylinder 52. for the several rotated positions of the spindle 18. It will be appreciated, that the side surface 56 could also be a inner side surface such as for example for a calibration to 50 which is a hollow cylinder or tubular. Once again, in an exemplary embodiment N rotated positions are employed. A nonlinear least-square algorithm may thereafter be employed to fit the measurements to a cylinder model to get the cylinder axis. The center of the top surface of the cylinder (Txi, Tyi, Tzi) (called the TCP of the cylinder is determined by the intersection of the determined cylinder axis and the top surface of the cylinder.

Next, the composite tool center position, denoted (Tx0, Ty0, Tz0), of the top surface of the cylinder 52, is thereafter readily calculated by an average of the several center positions. The average composite tool center position for all spindle positions is:

$Tx0 = \text{sum}(Txi)/N$ $Ty0 = \text{sum}(Tyi)/N$ $Tz0 = \text{sum}(Tzi)/N$

Advantageously, once the cylinder center and orientation of the axis of rotation for the spindle 18 is calibrated it is possible to calibrate other robot tools e.g., 60. First, the new tool orientation is assumed to be the same as the spindle rotating axis. In order to get TCP of all tools, the length of each tool needs to be measured and compared with the length of the cylinder. It will be appreciated that this measurement may be performed in advance, with the results stored in controller 30 for later use and processing. Additionally, updates may then be readily made as robot tools 60 change, are sharpened, reshaped, and the like as well as combinations including at least one of the foregoing.

At process block 190, the tool center point TCP, (Tx, Ty, Tz) of the new tool e.g., 60 may now be readily calculated according to:

$Tx = Tx0 + (\text{Tool Length} - \text{Cylinder Length}) * nx$ $Ty = Ty0 + (\text{Tool Length} - \text{Cylinder Length}) * ny$ $Tz = Tz0 + (\text{Tool Length} - \text{Cylinder Length}) * nz$ Where (Tx0, Ty0, Tz0) are the TCP positions of the cylinder (as determined above at process block 180) and (nx, ny, nz) are the coordinates for the spindle orientation normal vector as determined at process block 150).

Advantageously, the calibration technique disclosed herein does not rely on accounting for mechanical tolerances and can determine rotation axis regardless of mounting error. Moreover, the TCP of the calibration tool 50 (e.g., cylinder 52) is found with a CMM probe instead of using visual inspection, potentially increasing accuracy and reliability.

Figure 4A:
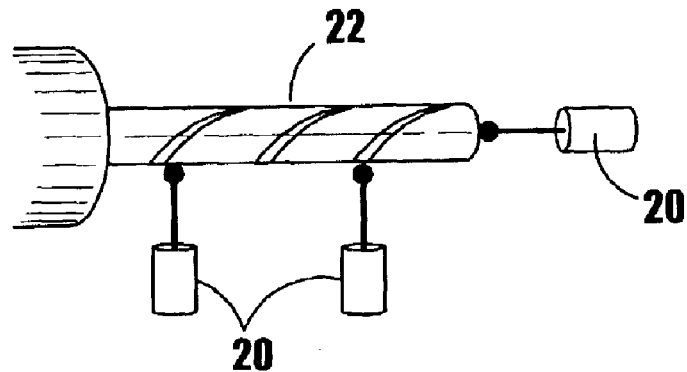
FIGS. 4A–4F depict illustrative measurements for tools of various shapes and configurations.
Figure 4B:
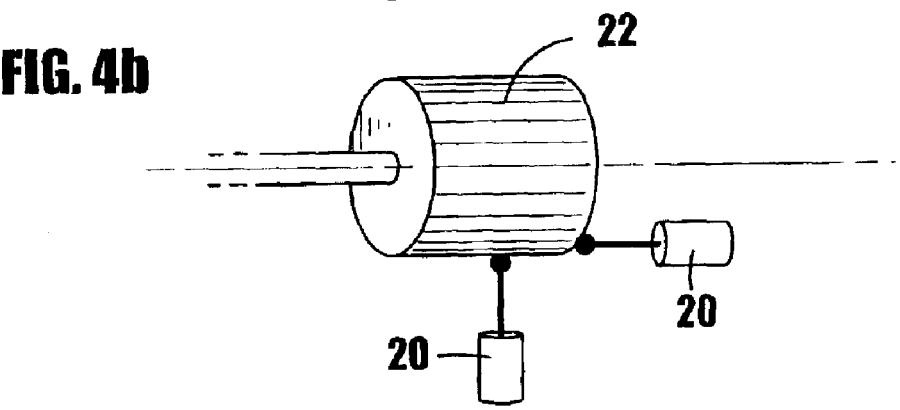
Figure 4C:
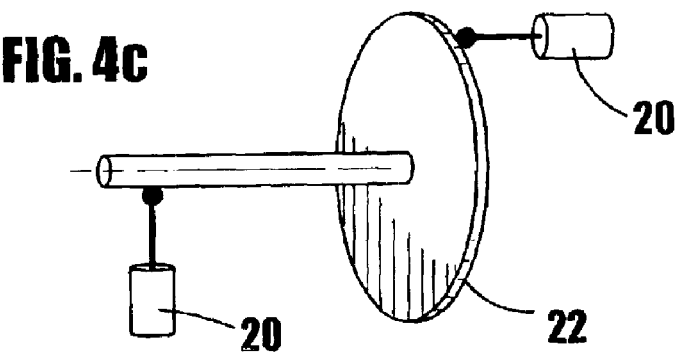
Figure 4D:
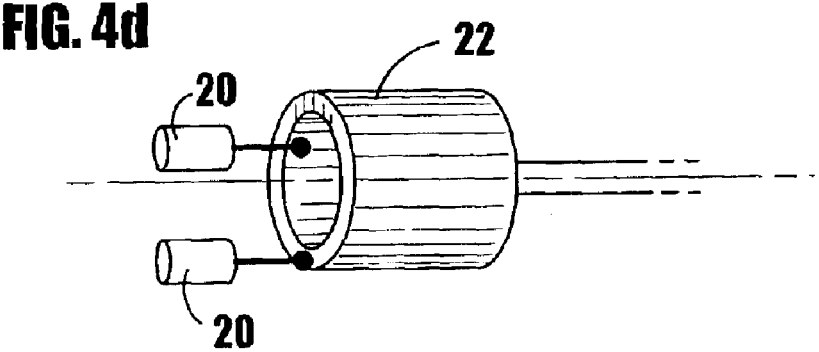
Figure 4E:
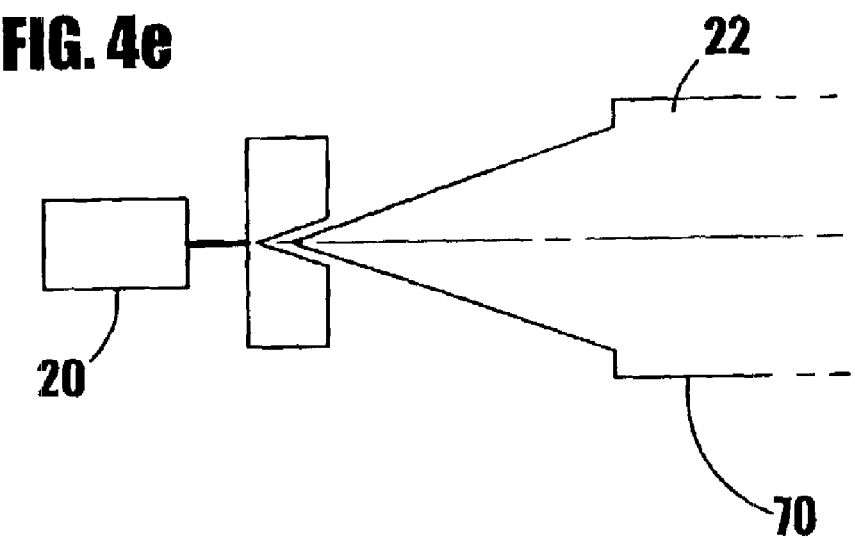
Figure 4F:
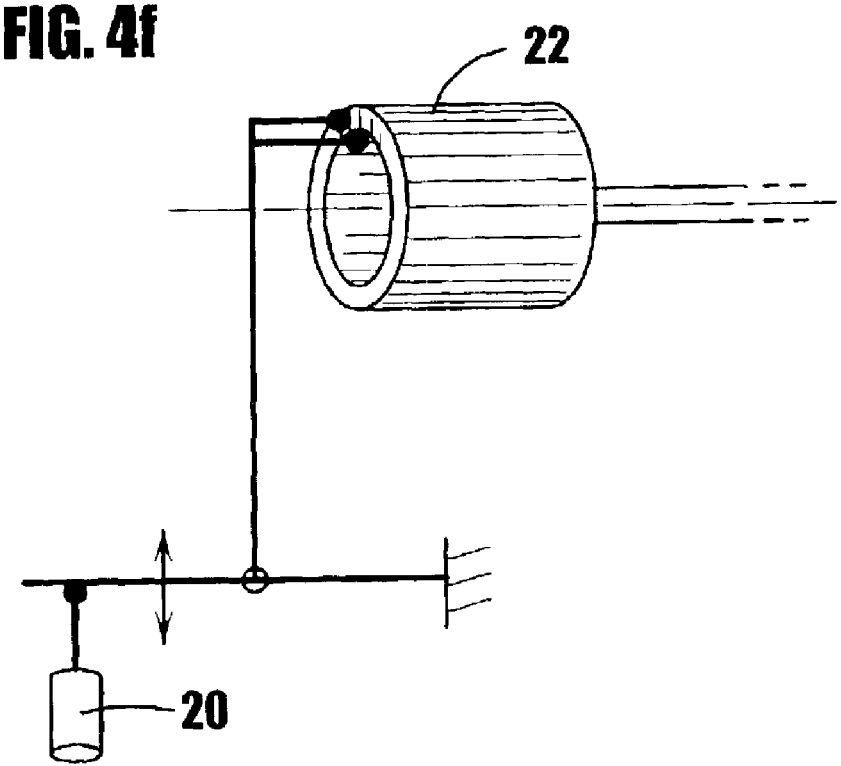

Referring now to FIG. 4E, in an alternative embodiment, a conically shaped calibration tool 70 may be employed with a probe 20 or CMM system such that the tool center point and axis of rotation may readily be determined. In this configuration, the conically shaped calibration tool (male) mates with a probe 20 which is also conically shaped but "female" such that a very accurate determination of the position of the probe 20 may be made. As described above, multiple measurements may be made with rotation of the calibration tool to ensure an accurate calibration for the axis of rotation. It will be appreciated that configurations that employ a more specialized measurement probe 20 facilitate easier computation for the calibration. Finally, it will be appreciated that one skilled in the art may now readily conceive of numerous other configurations and variations for measurement and calibration tool arrangements without departing from the scope of the invention.

While the invention has been described with reference to a particular structure, materials, and/or exemplary embodiment, it is not intended to be limited to the particulars disclosed herein. Moreover, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. The selection of particular wording herein is for the purposes of description and illustration, rather than for a particular limitation

What is claimed is:

1. A method of calibrating a robot having a rotable spindle for holding a tool, the method comprising:

disposing a calibration tool in said spindle;

measuring a plurality of positions associated with said calibration tool;

determining a rotation axis of said spindle based on said plurality of positions;

ascertaining a calibration tool center point based on said plurality positions;

computing a robot tool rotation axis and tool center point based on said determining a rotation axis; said calibration tool center point, and a difference in length between said calibration tool and a robot tool.

2. The method of claim 1 wherein said calibration tool is cylindrical and configured to be substantially coaxial with said rotable spindle.

3. The method of claim 2 wherein said measuring comprises a plurality of positions on a top surface of said calibration tool.

4. The method of claim 3 wherein said determining a rotation axis comprises an average of a plurality normals associated with a plurality of planes associated with said top surface of said calibration tool.

5. The method of claim 2 wherein said measuring comprises a plurality of positions on a side surface of said calibration tool.

6. The method of claim 5 wherein said ascertaining a calibration tool center point comprises a combination of a plurality of center points based on said plurality of positions on said side surface of said calibration tool.

7. The method of claim 1 wherein said measuring further comprises rotating said spindle to another angle and repeating said measuring.

8. The method of claim 1 wherein said computing comprises an intersection of said determined rotation axis of said spindle and said calibration tool center point.

9. The method of claim 1 wherein said calibration tool is at least one of: cylindrical, disc, spherical, conical, tubular and configured to be substantially coaxial with said rotable spindle.

10. The method of claim 1 wherein said calibration tool is conical and configured to be substantially coaxial with said rotable spindle and said measuring includes employing a coordinate measurement machine including position sensing and a conical probe configured to substantially mate with said calibration tool.

11. The method of claim 1 wherein said measuring includes measurements made with at least one of: contact sensors, displacement sensors, one dimensional coordinate measuring machines, two dimensional coordinate measurement machines, three dimensional coordinate measurement machines, and non-contacting sensors.

12. A system for calibrating a robot having a rotable spindle for holding a tool, the system comprising:
   a calibration tool disposed in said spindle of said robot;
   a measurement probe disposed at a known location within attainable distance of said robot with said calibration tool;
   a controller for implementing a measurement process comprising:
   measuring a plurality of positions associated with said calibration tool;
   determining a rotation axis of said spindle based on said plurality of positions;
   ascertaining a calibration tool center point based on said plurality positions;
   computing a robot tool rotation axis and tool center point based on said determining a rotation axis, said calibration tool center point, and a difference in length between said calibration tool and a robot tool.

13. The system of claim 12 wherein said calibration tool is cylindrical and configured to be substantially coaxial with said rotable spindle.

14. The system of claim 13 wherein said measuring comprises a plurality of positions on a top surface of said calibration tool.

15. The system of claim 14 wherein said rotation axis is determined as an average of a plurality normals associated with a plurality of planes associated with said top surface of said calibration tool.

16. The system of claim 13 wherein said plurality of positions comprises measurements on a side surface of said calibration tool.

17. The system of claim 16 wherein said calibration tool center point is ascertained as a combination of a plurality of center points based on said plurality of positions on said side surface of said calibration tool.

18. The system of claim 12 wherein said measurement process further comprises rotating said spindle to another angle and repeating said measuring.

19. The system of claim 12 wherein said robot tool rotation axis is computed based on an intersection of said determined rotation axis of said spindle and said calibration tool center point.

20. The system of claim 12 wherein said calibration tool is at least one of: cylindrical, disc, spherical, conical, tubular and configured to be substantially coaxial with said rotable spindle.

21. The system of claim 12 wherein said calibration tool is conical and configured to be substantially coaxial with said spindle and said measuring includes employing a coordinate measurement machine including position sensing and a conical probe configured to substantially mate with said calibration tool.

22. The system of claim 12 wherein said measurement probe includes at least one of: a contact sensor, a displacement sensors, a one dimensional coordinate measuring machine, a two dimensional coordinate measurement machine, a three dimensional coordinate measurement machine, and a non-contacting sensor.

* * * * *